United States Patent [19]

Clarkson

[11] 4,257,447
[45] Mar. 24, 1981

[54] GATE VALVE

[75] Inventor: Curtis W. Clarkson, Palo Alto, Calif.

[73] Assignee: The Clarkson Company, Palo Alto, Calif.

[21] Appl. No.: 7,200

[22] Filed: Jan. 29, 1979

[51] Int. Cl.³ .............. F16K 3/312; F16K 3/316; F16K 3/02

[52] U.S. Cl. ................ 137/375; 251/174; 251/327; 251/328; 138/94.3

[58] Field of Search ........... 251/327, 328, 174, 358; 137/375; 138/94.3, 94.5

[56] References Cited

U.S. PATENT DOCUMENTS

| | | | |
|---|---|---|---|
| 3,000,608 | 9/1961 | Williams | 251/328 X |
| 3,240,467 | 3/1966 | Caldwell | 137/375 X |
| 3,319,661 | 5/1967 | Shindler | 138/94.3 |
| 3,333,816 | 8/1967 | Williams et al. | 251/327 |
| 3,844,531 | 10/1974 | Grengs | 251/327 |
| 3,945,604 | 3/1976 | Clarkson | 251/326 X |
| 4,136,709 | 1/1979 | Rogers et al. | 137/375 |

OTHER PUBLICATIONS

Clarkson Co., Shop-Print, 4KG Series Tailings Valve; C2845; dated 1-24-77.

*Primary Examiner*—Arnold Rosenthal
*Attorney, Agent, or Firm*—LeBlanc, Nolan, Shur & Nies

[57] ABSTRACT

A packingless gate valve comprises a housing having two opposed resilient sleeve units that compressibly engage end to end in valve open condition and engage opposite sides of the gate in valve closed condition. Each sleeve unit is a resilient annular body formed at one end with an axially projecting seal lip near the inner periphery and has a bonded stiffening and gate guide element around the outer periphery at the one end. An integral gasket forming flange is formed on the other end of the sleeve body.

18 Claims, 10 Drawing Figures

GATE VALVE

This invention relates to packingless gate valves and more specifically to gate valves having special internal sleeve arrangements for sealing in all operative positions of the gate.

The valve of the invention is particularly adapted for the control of abrasive slurries and the like, but may be used for any fluid control. It is effectively an improvement over the type of valve disclosed in Clarkson U.S. Pat. No. 3,945,604 issued Mar. 23, 1976, differing thereover mainly in the internal sleeve arrangement and construction and coaction with the sliding gate.

The above-identified Clarkson patent discloses a gate valve wherein a resilient sleeve under axial compression engages one side of the relatively slidable gate. The sleeve is interiorly peripherally reinforced by a hard rubber ring at the end adjacent the gate. It has been proposed to mount this hard rubber reinforcing ring at the outer periphery of the sleeve, to provide an axially extending annular lip on the end of the sleeve at the gate, and to provide similarly modified sleeves at both sides of the gate in a valve assembly.

The present invention distinguishes over Clarkson and the proposed modifications by providing a special sleeve structure at opposite sides of the gate having novel coaction with the gate and mounted in a novel manner in the valve housing.

It is therefore a major object of the invention to provide a novel valve assembly wherein resilient sleeve units at opposite sides of the gate are mounted in a special manner in the valve housing and have special coaction with the relatively slidable gate.

A further object of the invention is to provide a novel gate valve assembly wherein the inner ends of axially compressed sleeve units engage opposite sides of the gate in valve closed condition and sealingly engage each other in valve open condition, and are of special structure providing improved coaction between the sleeve units and the relatively slidable gate.

A more specific object of the invention is to provide a novel gate valve assembly of this type wherein each sleeve end at the gate has an encircling thin reinforcing band of metal or the like that extends over to provide an axially facing wear resistant gate engaging and guiding surface.

Another object of the invention is to provide a novel gate valve assembly wherein opposed sleeve units under axial compression are coaxially mounted in a novel manner in a valve housing.

Another object of the invention is to provide as a removable and replacable subassembly for a gate valve a novel sleeve unit that consists essentially of a resilient cylindrical sleeve body having at the end adjacent the gate an axially extending annular compressible sealing lip and a stiffening strip or band of metal or the like around that end also providing a radially outer annular axially facing gate guide surface. Pursuant to this object the lip may be an annular rounded end formation projecting axially from the sleeve end at the inner periphery, and the guide surface may be provided by bonding as by vulcanizing to the outer periphery of the sleeve at that end an annular strip of thin metal adapted to be bent over the sleeve end to form a flat annular gate guide surface surrounding the lip formation, the annular strip preferably being adapted to be fitted within a machined sized bore in the valve housing. Also the opposite end of the sleeve body may be formed with an integral radial flange adapted to be compressed between the valve housing and the pipeline when installed.

Further objects of the invention will appear as the description proceeds in association with the appended claims and the accompanying drawings.

PREFERRED EMBODIMENTS

Figure 1:
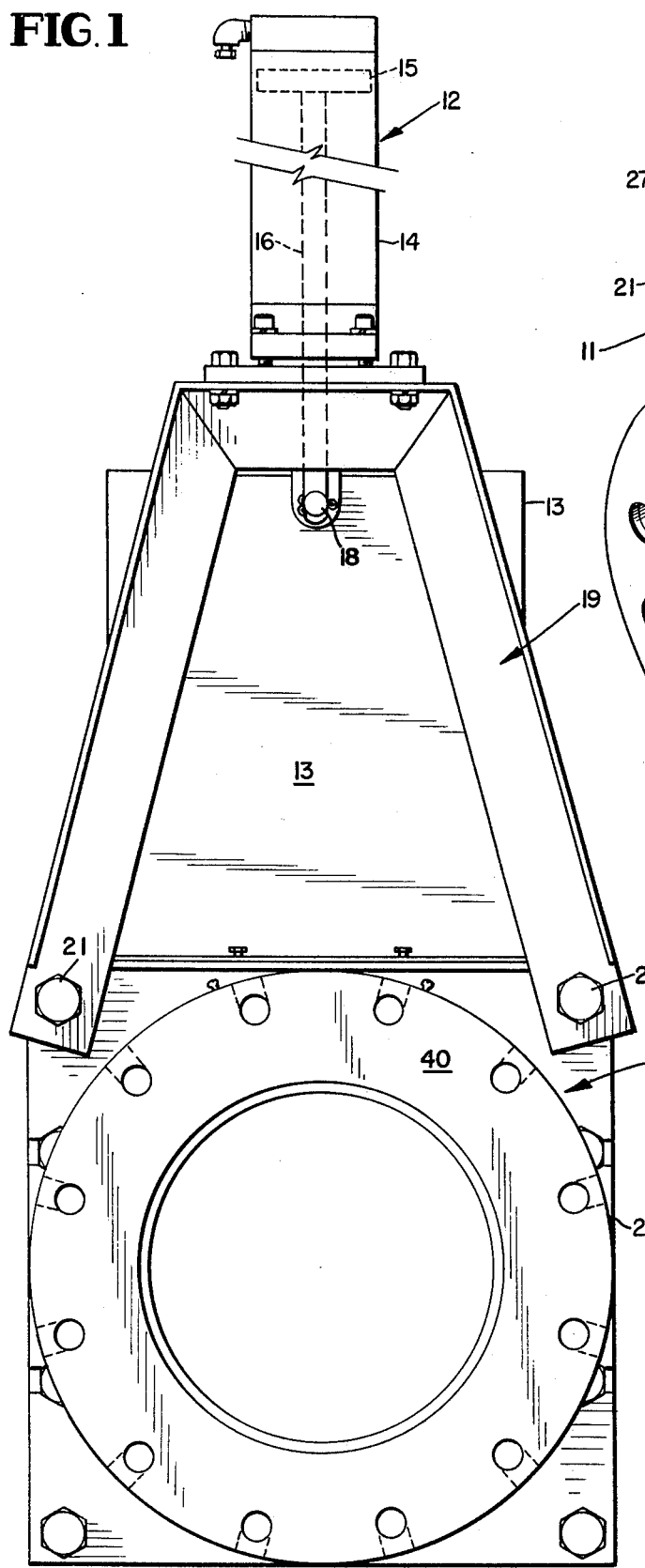
FIG. 1 is an end elevation showing a gate valve assembly according to a preferred embodiment.

Referring to the drawings the valve assembly comprises a housing 11 adapted to be inserted coaxially into a pipeline, and a gate actuator 12 mounted on the housing.

Figure 5:
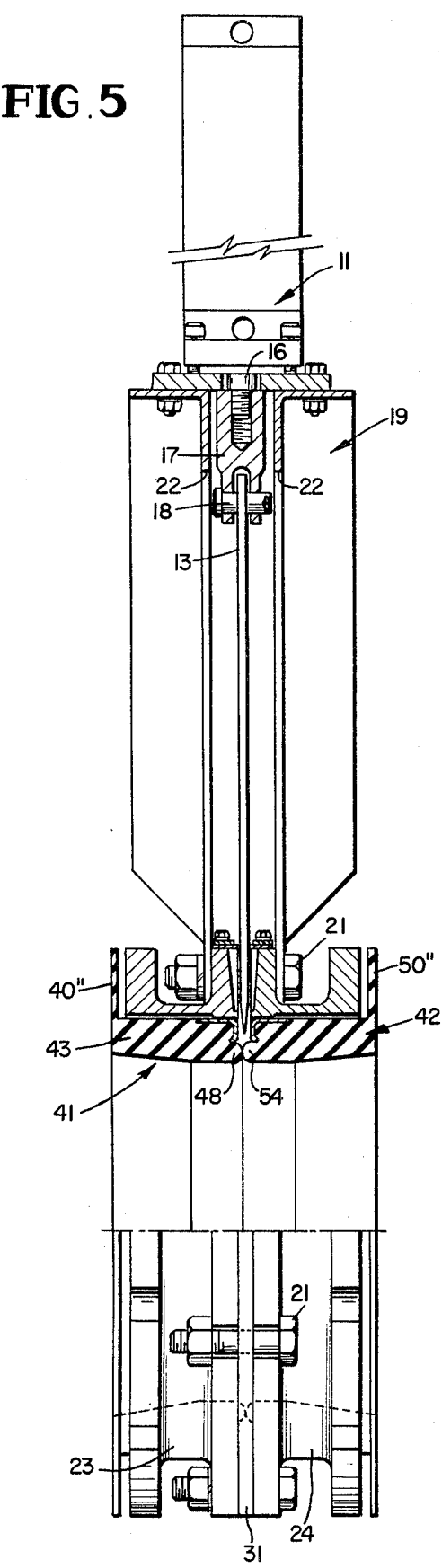
FIG. 5 is a side elevation partly in section to show the connection between the actuator and the valve gate.

The movable valve element comprises a flat smooth imperforate plate gate 3 of uniform thickness mounted for reciprocal movement in and out of the fluid flow path through the housing. The actuator is preferably a pneumatic or hydraulic cylinder 14 containing a piston rod 16 provided at the lower end with a bifurcated fitting 17 (FIG. 5) pivotally connected to a pin 18 on the upper end of plate 13. Upon selective admission of fluid under pressure to the cylinder chambers at opposite sides of piston 15 the gate 13 may be moved between the pipeline open position of FIG. 7 and the closed position of FIG. 10 later to be described in more detail.

Further description of the actuator and its function are not necessary to understand the invention which relates essentially to the valve structure within the housing, and its cooperation with gate 13. The actuator may be mounted on the housing by a rigid open ended frame 19 fixed at its lower end on the housing as by bolts 21 which as will appear may be two of the bolts holding the housing halves together. The sides of the frame are open at 22 (FIG. 5) to permit and observe passage of the gate 13 in its up and down movement.

Figure 2:
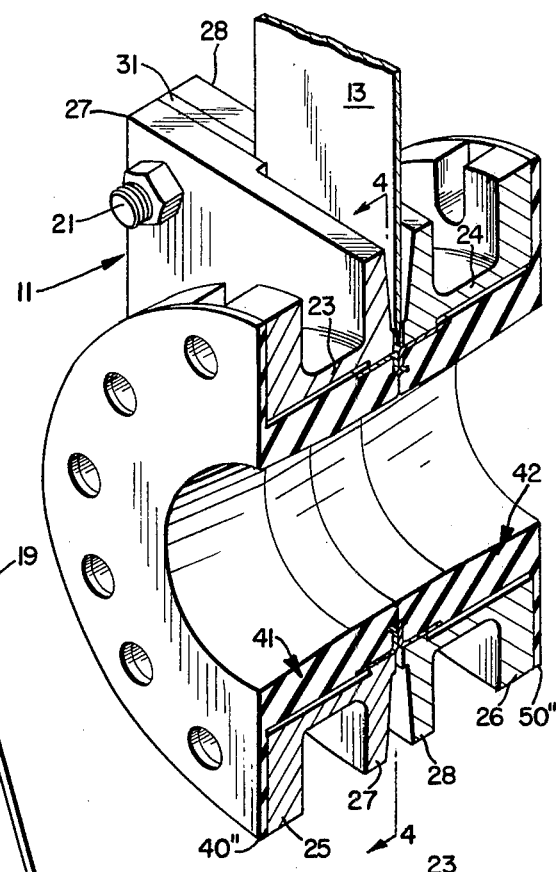
FIG. 2 is a perspective half-section through the valve body showing detail of the invention.
Figure 3:
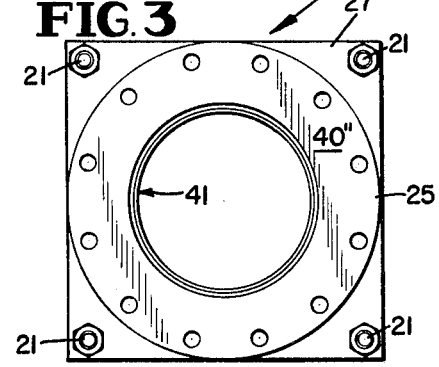
FIGS. 3 and 4 are opposite end views of a housing halve with its inserted seal sleeve, apart from the valve assembly.
Figure 4:
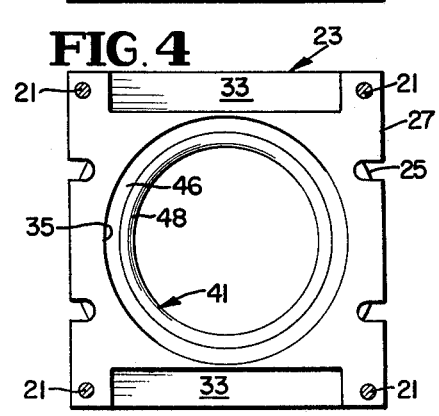

Housing 11 comprises opposed similar halves 23 and 24 having respective outer circular radial flanges 25 and 26 and inner rectangular radial flanges 27 and 28. Inner flanges 27 and 28 are rectangular and of the same size and as shown in FIG. 2 of larger area than flanges 25 and 26. The housing halves are rigidly secured together as by a series of bolts 21 extending through the adjacent inner flanges 27 and 28. Inner flanges 27 and 28 abut flush upon the opposite sides of two flat uniform thickness spacer strips 31 and 32 which are disposed between the housing halves at opposite sides to maintain between them a narrow space of sufficient width to pass gate 13 in operation as will appear. In this respect the housing is like that of the above-mentioned U.S. Pat. No. 3,945,604 to which reference is made for further detail. This gate passage or chamber space dimension is indicated at 33 in FIGS. 6–10 and it is of course of a fixed width slightly greater than the width of gate 13 when the bolt assemblies 21 are drawn tight. The housing halves are preferably machined metal castings.

Figure 6:
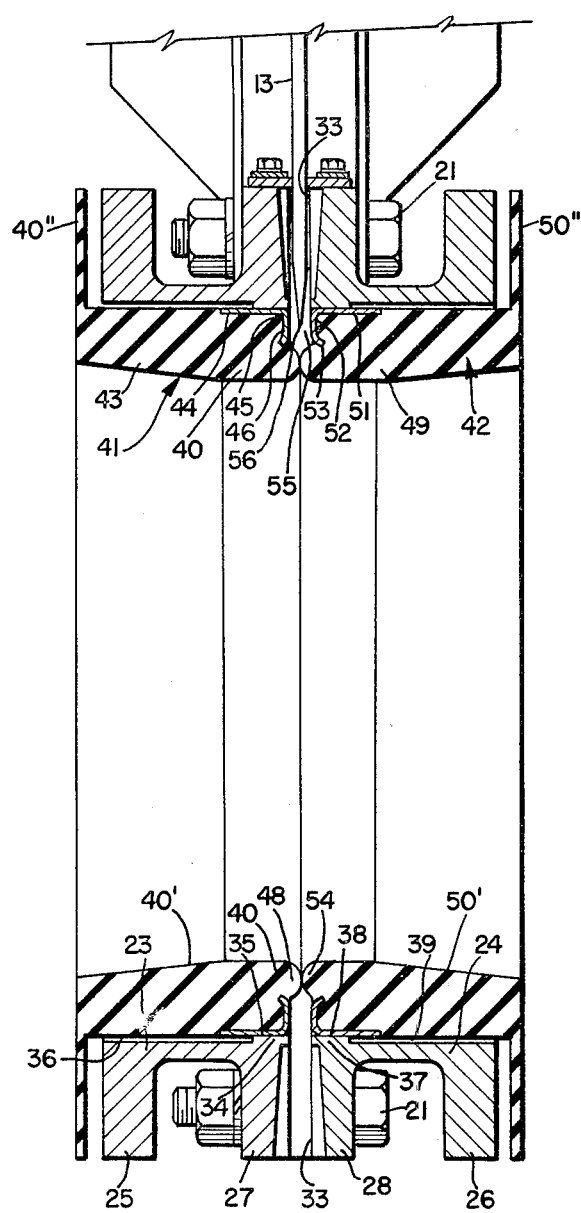
FIG. 6 is an enlarged fragmentary view mainly in section showing the valve components in open condition and prior to installation of the valve assembly into a pipeline.

As shown in FIG. 6 the inner periphery of housing 23 is formed with a laterally inner circular rib 34 that is accurately machined to provide a smooth cylindrical surface 35 of predetermined diameter. Axially outwardly of rib 34 the inner periphery of the housing half is recessed to provide a continuous shallow annular recess or space indicated at 36. Similarly the inner rib 37 of housing half 24 is machined to provide a smooth cylindrical surface 38, and an annular recess or space 39 is provided axially outwardly of this rib. In the assembly of FIG. 6, cylindrical surfaces 35 and 38 are of the same size and are coaxial.

Sealing sleeve units 41 and 42 are mounted in the respective housing halves. Sleeve unit 41 comprises an annular resilient body 43 of an elastomeric material such as a synthetic rubber and is of substantially uniform radial cross section at its inner end 40. Axially outwardly of portion 40, the inner periphery of body 43 conically tapers decreasingly as indicated at 40'. On the inner end of body 43 it is reinforced by an annular shaped stiffener ring in the form of an annular strip or band 44 bonded securely thereto around its outer periphery. Where strip 44 is of thin metal, such as steel, it is vulcanized to the rubber body. Preferably strip 44 is of stainless steel to be rust proof. In some instances strip 44 may be of hard polyurethane or equivalent plastic. The outer diameter of strip 44 is cylindrical and an effective continuation of the adjacent cylindrical outer surface of body 43 and it has a smooth fit within machined surface 35 so that sleeve unit 41 is accurately coaxially mounted in the assembly. It will be noted that space 36 surrounds sleeve body 43 and extends between the housing half and the tapered axially outer part of sleeve body 43 when the sleeve is mounted in housing half 23.

At its inner axial end strip 44 is formed with a right angle bend 45 and extends along the inner end of body 43 to form a flat gate contacting face 46 disposed at right angles to the axis of the sleeve, before turning axially inwardly again at its terminal 47 to anchor within rubber body 43.

Radially inwardly of metal strip 44, the end of rubber body 43 is formed with an axially inwardly extending rounded end annular lip 48 preferably disposed near the inner periphery of the sleeve. Lip 48 when relaxed extends substantially further axially than face 46 for a purpose to appear.

As shown in FIG. 6 sleeve unit 41 is also formed at its axially outer end with a thin integral radial flange 40" of about the same outer diameter as housing flange 25. When the parts are in assembly before introduction into a pipeline, flange 40" may be spaced axially from flange 25 (FIG. 6) but when the valve assembly is in the pipeline sleeve flange 40" is compressed between flange 25 and the adjoining flange (FIG. 7) of pipeline P.

Similarly sleeve unit 42 is an annular resilient body 49 carrying a bonded annular metal stiffener strip 51 around its outer periphery which strip turns inwardly at right angles to provide a flat gate contacting face 52 and terminates in an inturned end 53 anchored in body 49. Axially inwardly of strip 51 the resilient body 49 is formed with an annular axially projecting rounded end lip 54 like lip 48. The sleeve body is of uniform radial cross section 50 where surrounded by strip 51 and tapers axially outwardly therefrom at its inner outer peripheral portion 50', similarly to the sleeve at the other side. The outer diameter of strip 49 is such as to fit smoothly within the machined surface 38 of the housing half. An integral radial flange 50" is formed on the axially outer end of body 49 and it serves the same function as flange 40" of body 43.

In practice sleeve units 41 and 42 may be identical and interchangeable, so that inventory may be held to a minimum.

When the sleeve units 41 and 42 are mounted within the housing, with the housing halves bolted together but not yet installed in a pipeline, the parts are positioned as shown in FIG. 6, so that sleeve end lips 48 and 54 are coaxially aligned and preferably in light compressive contact. The valve is open. At this time the distance 55 between sleeve end faces 46 and 52 is usually greater than the thickness of the gate plate 13.

When the open valve is mounted in the pipeline (FIG. 7) flanges 40" and 50" are clamped, the sleeve bodies are compressed and axially shortened so that the space between faces 46 and 52 is shortened to less than the thickness of gate 13, and lips 48 and 54 are compressibly engaged over a considerable annular area and sufficiently to form an annular seal against escape of fluent material passing through the valve. Excess sleeve material may displace into recesses 36 and 39.

The lower edge of gate plate 3 is tapered to provide a relatively sharp, straight knife edge as shown at 56, and initially may extend within space 55 but not far enough to appreciably forcibly engage faces 46 and 52. This is the normal valve open condition of the valve assembly operably mounted in a pipeline, wherein the gate has not yet effectively penetrated the sleeve seals.

Figure 8:
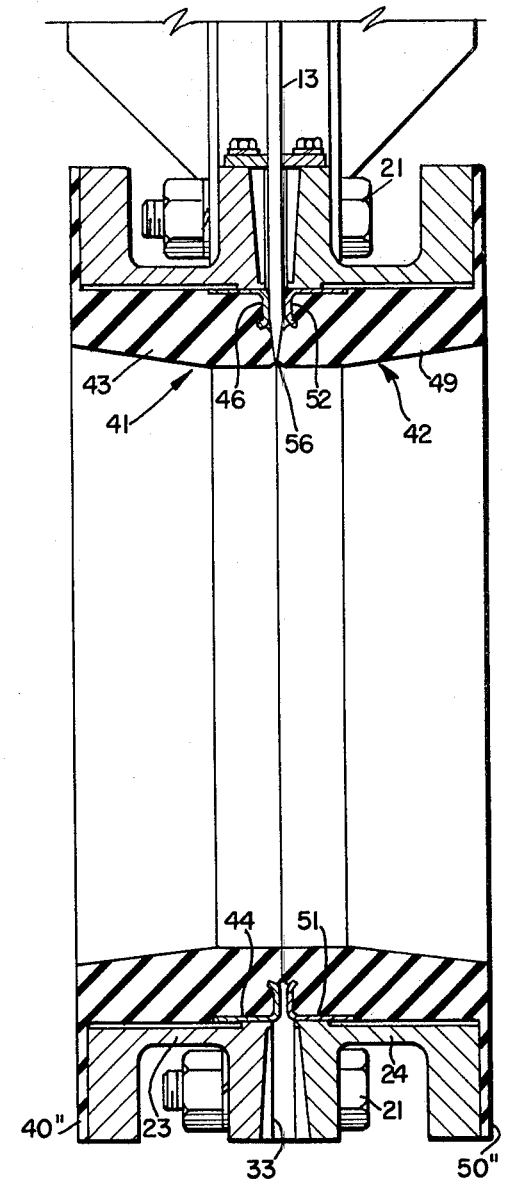
FIGS. 8, 9 and 10 are sections similar to FIG. 7 showing the valve in various stages at starting, partly closed and fully closed conditions respectively.
Figure 9:
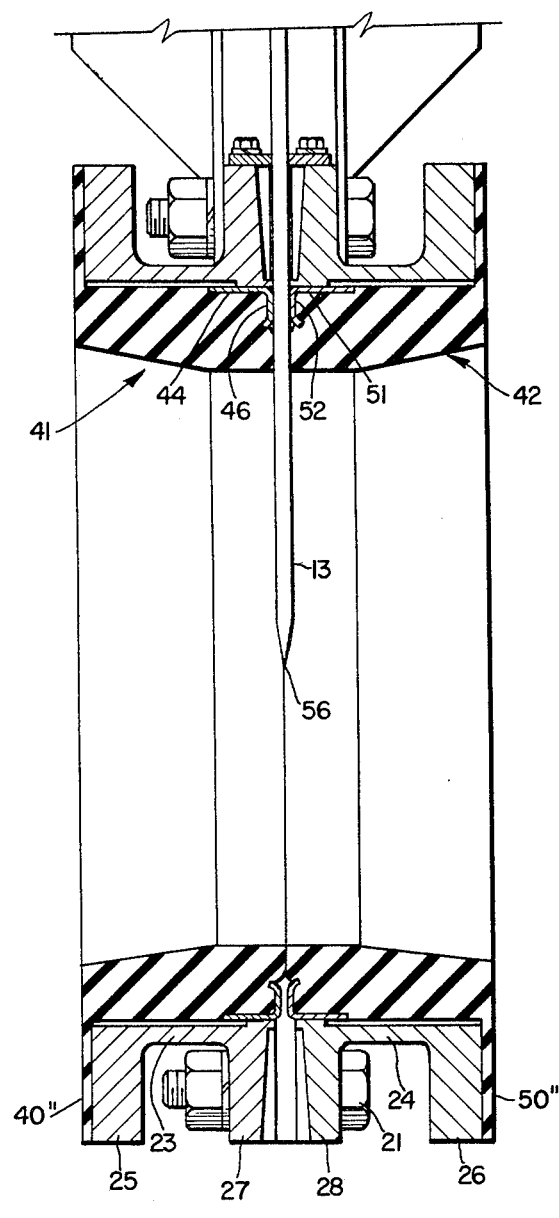
Figure 10:
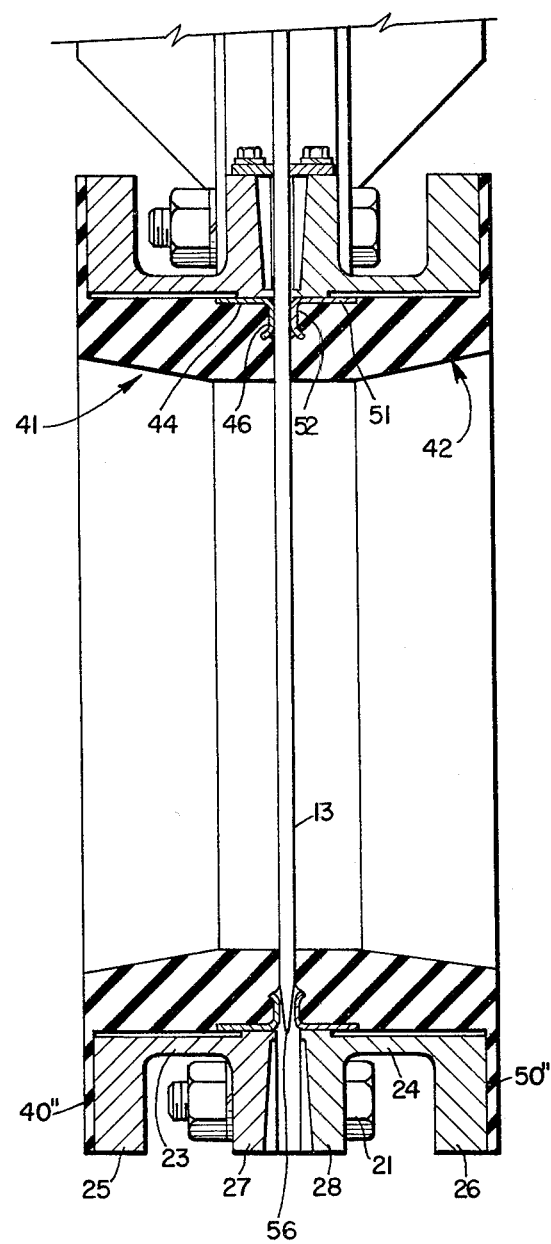

FIGS. 8, 9 and 10 show in succession the coaction of the gate and sleeve seals as the valve undergoes a closing operation.

In FIG. 8 following downward displacement of piston 15, the descending gate lower edge enters and forces apart the upper sector of the sleeve as it is slidably disposed between sleeve end faces 46 and 52 and then forces apart the lips 48 and 54.

As the gate moves down the stiffener strips are forcibly moved away from each other thereby increasing the axial compression in the elastic sleeve bodies while somewhat relieving the sealing compression between lips 48 and 54 so that the tapered lower knife edge of the plate may more easily separate the lips. This in turn reduces friction between the downwardly moving gate, which is slidably guided between sleeve end faces 46 and 52, and the opposing lips. The metal stiffener strips thereby provide for good smooth reduced friction sliding contact with the gate.

As the gate 13 penetrates further toward closed position (FIG. 9) the seal between lips 48 and 54 is progressively parted, while the relatively soft sleeve material effectively flows around the knife edge. The combination of the knife edge and the gate and the soft compressible material of the sleeve lips prevents any leakage from the valve during gate closing and opening operations.

FIG. 10 shows the gate in final closed valve position. By this time the knife edge has passed the lower sector of the seal lips 48 and 54 and the gate is disposed between them, while the knife edge projects into the space below. At this time the opposed flat smooth side surfaces of the gate plate 13 are uniformly engaged under compression by the compressed seal lips, which may even be substantially flattened as shown, so that there is a complete annular seal of good radial extent within the valve. At this time the seal lips are in uniform maximum compression, and the internal pressure of the fluid or slurry in the pipeline will further force the upstream sleeve lips into engagement with the gate 13, so that there is no leakage in the valve closed position, this action being aided by the tapered inner surface portion of the sleeve.

Figure 7:
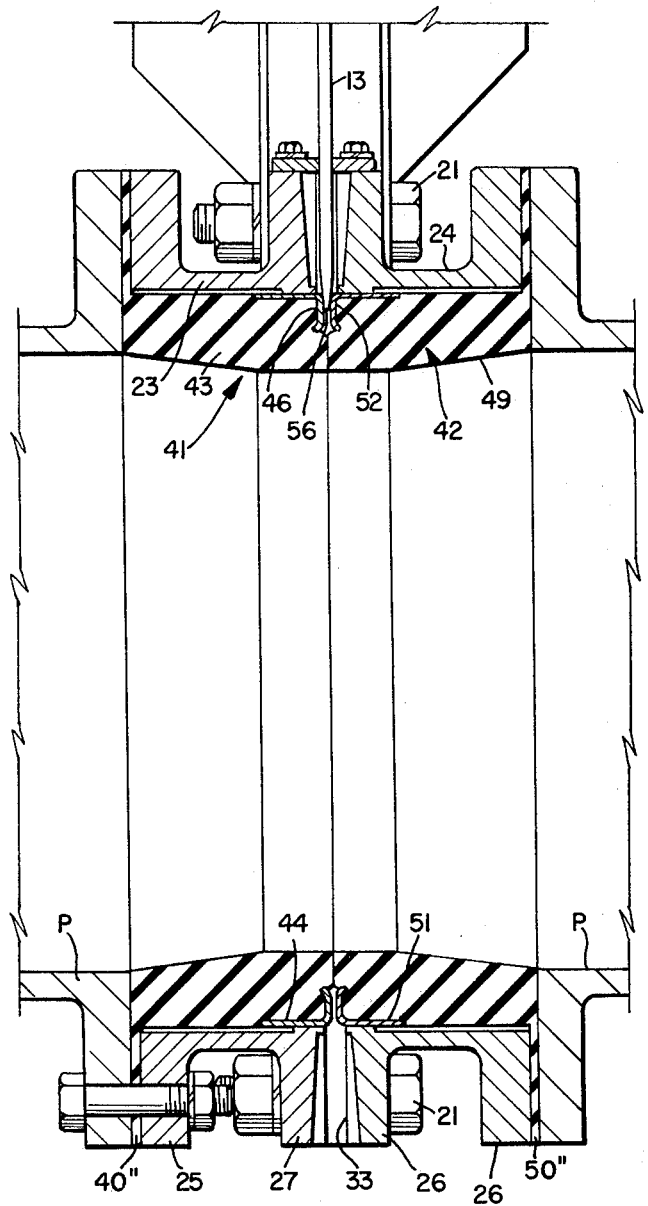
FIG. 7 is a section similar to FIG. 6 showing the fully open valve assembly inserted in a pipeline with the opposed seal sleeves in end abutment.

During movement of the gate 13 from the closed position of FIG. 10 to the open position of FIG. 7 substantially the reverse of the above takes place, the resiliency of the seal material maintaining leaktight sealing sliding contact between lips 48 and 54 until the gate is withdrawn from between the lips.

The valve of the invention is a two-way valve, that is it may control flow in either direction in the pipeline and may be reversed end for end. The sleeve units 41 and 42 are essentially identical so that either may be reversed and function as above in the assembly. The individual sleeve units are readily removed and replaced when damaged or worn.

The foregoing novel sleeve unit construction can be used as the single sleeve unit in the Clarkson patent valve.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A packingless gate valve assembly comprising two body housing members having coaxial through passages, means securing said housing members together in end to end relation with means therebetween to define a relatively narrow transverse gate chamber, unitary annular sealing sleeve units lining each of said passages and extending the entire lengths of said passages whereby each sleeve has an inner end extending into said chamber and an outer end at a passage end remote from said chamber, each of said sleeve units extending into said chamber in the form of annular resilient lips adapted to sealingly engage each other under compression in the open position of said valve, and an imperforate gate slidable through said chamber between a valve open position where it does not block fluid flow through said passages and a valve closed position wherein it is interposed between said sealing lips.

2. A packingless gate valve assembly comprising two body housing members having coaxial through passages, means securing said housing members together in end to end relation with means therebetween to define a relatively narrow transverse gate chamber, annular sleeve units lining each of said passages, each of said sleeve units extending into said chamber in the form of annular resilient lips adapted to sealingly engage each other under compression in the open position of said valve, and an imperforate gate slidable through said chamber between a valve open position where it does not block fluid flow through said passages and a valve closed position wherein it is interposed between said sealing lips, each of said sleeve units comprising an axially compressible annular body of elastomeric material, and there being an encircling thin stiffening band of harder material bonded around the outer periphery of each body at the gate engaging end.

3. In the valve assembly defined in claim 2, each said band being turned to extend over the adjacent sleeve end to provide a wear resistant gate guide surface on the sleeve unit.

4. In the valve assembly defined in claim 2, means in said housing members providing accurately machined cylindrical passage surfaces opening to said chamber, and each of said bands being sized to snugly fit with said cylindrical passage surfaces whereby to accurately align said sleeve units in the assembly.

5. In the valve assembly defined in claim 1, each of said sleeve units having tapered annular internal peripheral portions at the outer ends whereby each said unit is of increasing internal diameter toward the outer end of the associated passage.

6. In a gate valve assembly, two hollow housing members having coaxial cylindrical passages rigidly secured together end to end with axial spacer means between them defining a relatively narrow transverse gate receiving and guiding space disposed normal to said passages, sleeve units comprising annular bodies of greater axial length than said space lining each of said passages and having at one end annular resilient end lips that in the valve open position extend through said space into sealing engagement with each other, a reinforcing ring within each of said sleeves radially outwardly of its associated lip and providing a gate engaging and guiding surface on the sleeve end, each of said lips projecting axially beyond its associated ring, a gate member having an imperforate portion slidable in said space between a valve closed position wherein it blocks flow through said valve and a valve open position wherein it permits unobstructed flow through said valve, said lips being sufficiently resilient to permit sliding movement of the gate member between said positions and being compressed in resilient sealing engagement with sides of said gate member in the valve closed position.

7. In the gate valve defined in claim 6, each said ring being of a material of greater hardness than the sleeve body whereby the ring maintains the configuration of the softer sleeve body while the valve is being opened and closed.

8. In the gate valve defined in claim 7, said rings each being a shaped thin metal ring molded into the outer periphery of said sleeve so as to provide both axially and radially facing metal surfaces of said sleeve at the end adjacent said gate.

9. In the gate valve defined in claim 7, said rings being of hard smooth abrasion resistant plastic.

10. A sleeve subassembly for a gate valve passage comprising an annular body of resilient material having an annular passage engaging outer periphery and an end that is to be adjacent the gate provided with a reinforcing and gate guiding ring in the form of a shaped annulus of thin wear resistant material consisting mainly of a peripheral band section extending around and comprising an effective continuation of the outer periphery of the sleeve body and a flat integral radial section extending inwardly over said end of the body so as to be first engaged by a gate moving to valve closed position, and an integral annular seal lip on said body end disposed radially inwardly of and projecting axially beyond said ring.

11. The sleeve subassembly defined in claim 10, wherein said body is rubber and said ring is of sheet metal vulcanized to said body.

12. The sleeve assembly defined in claim 10, wherein said ring is of hard smooth synthetic plastic material.

13. A sleeve unit for a gate valve comprising an annular body of resilient material formed at one end with an integral axially projecting annular compressible sealing lip and at its other end with an external integral radial flange, and a hard reinforcing and gate guiding ring bonded around said body at its said one end and extending over said end to provide a gate engaging end surface on said unit.

14. In the valve assembly defined in claim 1, each of said sealing sleeve units being a unitary axially compressible annular body.

15. In the valve assembly defined in claim 14, means for securing the end of each said sleeve that is longitudinally remote from said chamber to a body housing member.

16. In the valve assembly defined in claim 1, means providing a radially extending annular flat gate guiding surface of harder material than said sealing lips on the inner end of each said sleeve and disposed radially outwardly of said sealing lips.

17. In the gate valve defined in claim 6, said rings being of sheet metal bonded to said sleeve.

18. A packingless gate valve assembly comprising two body housing members having coaxial through passages, means securing said housing members together in end to end relation with means therebetween to define a relatively narrow transverse gate chamber, annular sealing sleeve units lining each of said passages, each of said sealing sleeve units being a unitary axially compressible annular body, each of said sleeve units extending into said chamber in the form of annular resilient lips adapted to sealingly engage each other under compression in the open position of said valve, an imperforate gate slidable through said chamber between a valve open position where it does not block fluid flow through said passages and a valve closed position wherein it is interposed between said sealing lips, and means for securing the end of each said sleeve that is longitudinally remote from said chamber to a body housing member, said securing means comprising a unitary radial flange on said sleeve clamped upon the associated body housing member.

* * * * *